Patented Sept. 13, 1949

2,481,838

UNITED STATES PATENT OFFICE 2,481,838

PREPARATION OF SYNTHETIC RUBBER LATICES

George U. Glasgow, New York, N. Y., assignor to United States Rubber Company, New York, N. Y., a corporation of New Jersey No Drawing. Application April 21, 1948, Serial No. 22,500

6 Claims. (Cl. 260—8)

This invention relates to an improvement in the process for the preparation of synthetic rubber latices.

It is known that the viscosity of synthetic rubber latices depends upon the amount of synthetic rubber in the latex—the higher the solids content of the latex, the greater the viscosity. It is difficult to produce high solids synthetic rubber latices, i. e. latices having over 45% solids concentration directly in the reactor since the viscosity of the latex increases to the point where stirring of the reactor batch is inefficient and heat transfer from the reactor batch to the reactor jacket is poor, whereby control of the polymerization is lost. Also the high viscosity of such synthetic rubber latices at room temperature unduly restricts their use in processes requiring direct application of such latices.

I have found that the viscosity of a synthetic rubber latex produced by emulsion polymerization is greatly reduced if the polymerization is carried out in the presence of an acylated casein, and that consequently such synthetic rubber latices may be satisfactorily prepared with a much higher solids content than in conventional synthetic rubber practice.

According to the present invention, the synthetic rubber latex is prepared by polymerizing the aqueous emulsion of polymerizable monomers in the presence of a small amount of an acylated casein. Acylated caseins, as is known, may be prepared by the reaction of fatty acid anhydrides or fatty acid chlorides on casein (Ind. & Eng. Chem., Ind. Ed., vol. 38, pages 90–94; 1239–1242). The acyl content may be from 2 to 25% of an acylated casein product. The acylating agent may be the anhydride or chloride of fatty acids having 2 to 18 carbon atoms. For example, one may use, according to the present invention, the acetyl propionyl, butyryl, caproyl, caprylyl, pelargonyl, capryl, lauroyl, myristoyl, palmitoyl, oleoyl, or stearoyl derivatives of casein.

In carrying out the present invention, the aqueous emulsion polymerization for the preparation of the desired synthetic rubber latex is carried out in the usual manner, except that the acylated casein is added to the aqueous emulsion, and the water content of the emulsion may be decreased. The emulsion polymerization, according to the present invention, is conventional except for the presence of the small amount of acylated casein which reduces the viscosity of the synthetic rubber latex and permits the preparation of higher solids content latices. The amount of acylated casein may be from .05 to .5 part by weight per 100 parts of polymerizable monomers. Over .5 part of acylated casein per 100 parts of polymerizable monomers has a tendency to destabilize the latex and form flocculated particles. The present invention may be used in the preparation of synthetic rubber latex having a total solids content, e. g. in preparing conventional 25% to 45% solids concentration latices having greatly lowered viscosities, and in preparing synthetic rubber latices having solids concentrations above 45% up to 60%, which are very difficult, if not almost impossible to prepare by conventional commercial procedures. The acylated casein is preferably added to the initial emulsion of polymerizable monomers in order to obtain the maximum advantage of the acylated casein, but if desired, the acylated casein may be added at a later stage of the polymerization before one-half the final polymerization has taken place so that in any case a major proportion of the desired polymerization of the polymerizable monomers is carried out in the presence of the acylated casein.

In the preparation of the synthetic rubber latex, as is known, polymerizable monomeric compounds are emulsified in water with the aid of an emulsifying agent, such as a soap or other surface active agent, and the polymerization is made to take place generally at elevated temperatures in the presence of a catalyst and other regulating materials. Such polymerizable material may be one or a mixture of butadiene-1,3 hydrocarbons, for example, butadiene-1,3, methyl-2-butadiene-1,3 (isoprene), piperylene, 2,3-dimethylbutadiene-1,3. The polymerizable material as is known may be a mixture of one or more of such butadiene-1,3 hydrocarbons with one or more other polymerizable compounds which are capable of forming rubbery copolymers with butadiene-1,3 hydrocarbons, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

The following examples are illustrative of the invention, all parts referred to therein being by weight:

Example I

A reactor batch of an aqueous emulsion of a mixture of butadiene and styrene was made up according to the following formulation:

| | Parts |
|---|---|
| Butadiene | 50 |
| Styrene | 50 |
| Potassium persulfate | .3 |
| Sodium abietate | 2 |
| Sodium hydroxide | .3 |
| Dodecyl mercaptan | .5 |
| Caprylyl casein | .1 |
| Water | 70 |

The caprylyl content of the caprylyl casein was about 20%.

The caprylyl casein and dodecyl mercaptan (regulator) were added to the styrene, which was in turn added to the aqueous solution of the sodium abietate (soap emulsifying agent), sodium hydroxide (stabilizer), and potassium persulfate (catalyst) in the reactor vessel. The butadiene was finally added to the reactor batch and polymerization was carried out at 45° with continuous agitation for 60 hours. The conversion of monomers to polymer was 95%, giving a 55% solids content latex having a viscosity between 100 and 200 centipoises and free from coagulum or flocculated particles. Without the caprylyl casein, the latex is more viscous and contains considerable coagulum and flocculated particles.

Example II

An aqueous emulsion of polymerizable monomers similar to Example I but with .25 part of lauroyl casein (lauroyl content about 20%) as the acylated casein, was prepared according to the following formulation:

| | Parts |
|---|---|
| Butadiene | 50 |
| Styrene | 50 |
| Potassium persulfate | .3 |
| Sodium abietate | 2 |
| Sodium hydroxide | .25 |
| Dodecyl mercaptan | .5 |
| Lauroyl casein | .25 |
| Water | 70 |

Polymerization was carried out at 45° C. with continuous agitation for 50 hours, giving a conversion of monomers to polymer of 95%. The final synthetic rubber latex had a total solids content of over 55%, and a viscosity between 100 and 200 centipoises without coagulum or flocculated particles. Without the lauroyl casein, the final latex is much more viscous and contains considerable flocculated particles. If ordinary casein is substituted for the acylated casein in the above examples, latices containing large amounts of coagulum result.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The improvement in the process for the preparation of synthetic rubber latex by the emulsion polymerization with a soap emulsifying agent of polymerizable monomers selected from the group consisting of butadienes-1,3 and mixtures of butadiene-1,3 with compounds which contain a single $CH_2=C<$ group and are copolymerizable with butadienes-1,3 which comprises carrying out the emulsion polymerization in the presence of .05 to .5 part by weight of acylated casein, the acyl groups being fatty acid acyl groups, per 100 parts of polymerizable monomers.

2. The improvement in the process for the preparation of synthetic rubber latex by the emulsion polymerization with a soap emulsifying agent of polymerizable monomers selected from the group consisting of butadienes-1,3 and mixtures of butadienes-1,3 with compounds which contain a single $CH_2=C<$ group and are copolymerizable with butadienes-1,3 which comprises carrying out at least a major proportion of the emulsion polymerization in the presence of .05 to .5 part by weight of acylated casein, the acyl groups being fatty acid acyl groups, per 100 parts of polymerizable monomers.

3. The improvement in the process for the preparation of synthetic rubber latex having 45 to 60% solids concentration by the emulsion polymerization with a soap emulsifying agent of polymerizable monomers selected from the group consisting of butadienes-1,3 and mixtures of butadienes-1,3 with compounds which contain a single $CH_2=C<$ group and are copolymerizable with butadienes-1,3 which comprises carrying out at least a major proportion of the emulsion polymerization in the presence of .05 to .5 part by weight of acylated casein, the acyl groups being fatty acid acyl groups, per 100 parts of polymerizable monomers.

4. The improvement in the process for the preparation of synthetic rubber latex by the emulsion polymerization with a soap emulsifying agent of a mixture of butadiene-1,3 and styrene which comprises carrying out the emulsion polymerization in the presence of .05 to 5 part by weight of acylated casein, the acyl groups being fatty acid acyl groups, per 100 parts of polymerizable monomers.

5. The improvement in the process for the preparation of synthetic rubber latex by the emulsion polymerization with a soap emulsifying agent of a mixture of butadiene-1,3 and styrene which comprises carrying out at least a major proportion of the emulsion polymerization in the presence of .05 to .5 part by weight of acylated casein, the acyl groups being fatty acid acyl groups, per 100 parts of polymerizable monomers.

6. The improvement in the process for the preparation of synthetic rubber latex having 45 to 60% solids concentration by the emulsion polymerization with a soap emulsifying agent of a mixture of butadiene-1,3 and styrene which comprises carrying out at least a major proportion of the emulsion polymerization in the presence of .05 to .5 part by weight of acylated casein, the acyl groups being fatty acid acyl groups, per 100 parts of polymerizable monomers.

GEORGE U. GLASGOW.

REFERENCES CITED

The following references are of record in the file of this patent:

UNITED STATES PATENTS

| Number | Name | Date |
|---|---|---|
| 2,109,468 | Becker | Feb. 15, 1938 |

OTHER REFERENCES

Gordon et al., Ind. Eng. Chem. vol. 38, pages 1239-1242. (Copy in Scientific Library.)